B. O. HUTCHISON.
METER READING CHART.
APPLICATION FILED FEB. 28, 1907.
1,075,256.
Patented Oct. 7, 1913.
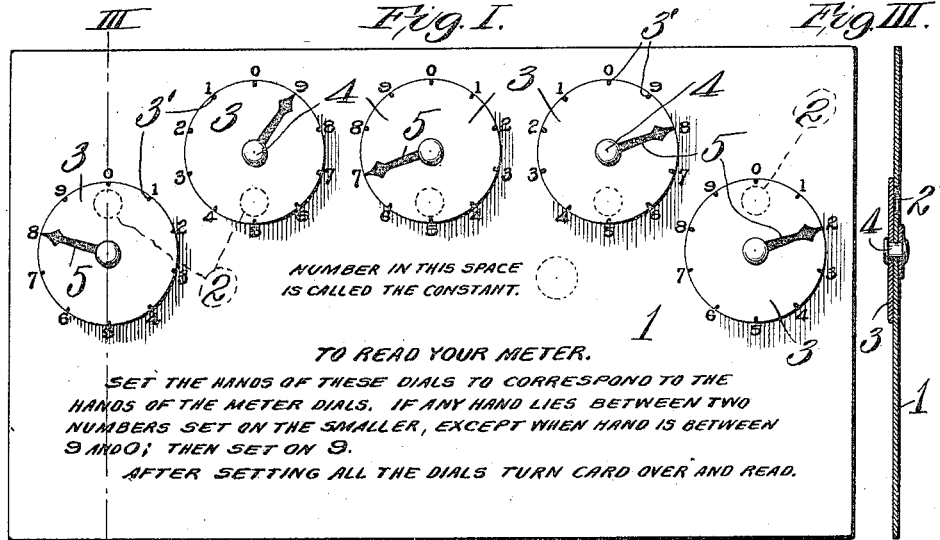
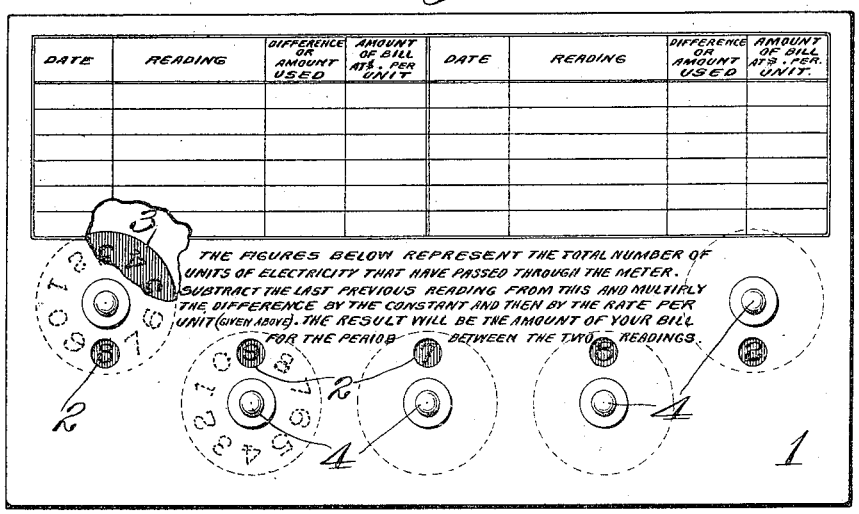
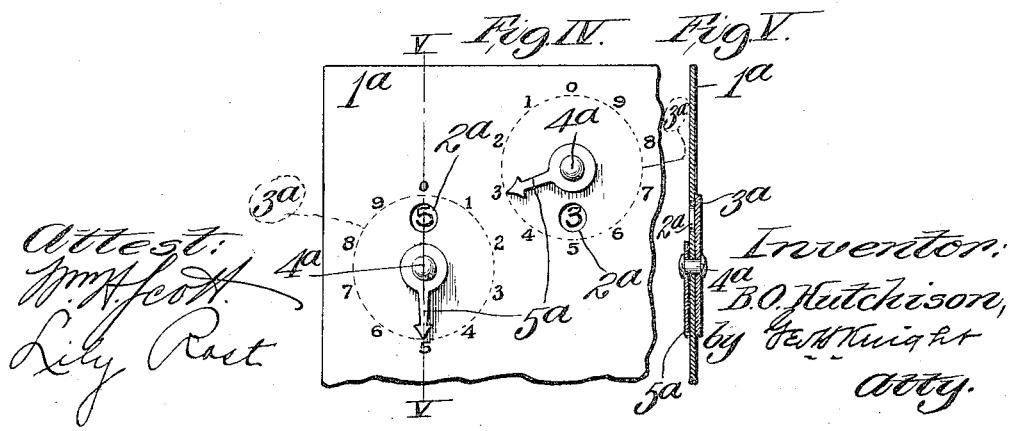

UNITED STATES PATENT OFFICE.

BENJAMIN O. HUTCHISON, OF UPPER ALTON, ILLINOIS.

METER-READING CHART.

1,075,256.   Specification of Letters Patent.   Patented Oct. 7, 1913.

Application filed February 28, 1907. Serial No. 359,850.

*To all whom it may concern:*

Be it known that I, BENJAMIN O. HUTCHISON, a citizen of the United States of America, residing in Upper Alton, in the county of Madison and State of Illinois, have invented certain new and useful Improvements in Meter-Reading Charts, of which the following is a full, clear, and exact description, reference being had to the accompanying drawing, forming part of this specification.

My invention relates to a chart for reading electric or other meters and it has for its object to furnish a chart of this character having parts which may be readily manipulated to provide an easy method of reading the indications of a meter.

Figure I is an elevation of the obverse side of my chart. Fig. II is an elevation of the reverse side of the chart. Fig. III is a cross section taken on line III—III, Fig. I. Fig. IV is an elevation of the obverse side of a modified form of chart. Fig. V is a cross section taken on line V—V, Fig. IV.

1 designates the chart sheet upon which is printed at both the obverse and reverse sides, directions for the use of the chart and also upon the reverse side spaces for memoranda of meter readings. In the chart sheet is a series of sight perforations 2 that extend entirely through the sheet and which are preferably located in alinement with each other.

3 are dials rotatably connected to the chart sheet by arbors 4 and which have printed thereon at their front sides pointers 5. Upon the obverse side of the chart sheet and located around each dial 3 are the numerals 1 to 9 and "0", the said numerals and "0" being spaced apart and so disposed that the pointer on each dial may be moved to them consecutively. Each dial 3 has printed upon its rear face the numerals 1 to 9 and "0" arranged correspondingly to the arrangement of such numerals and "0" upon the chart sheet and so disposed that they may be brought consecutively to the sight perforations in the chart sheet.

In the use of the chart the various dials 3 are rotated at will and set so that their pointers will be directed to numerals upon the chart sheet to correspond to the positions of the pointers of a meter being read relative to the dial over which the meter pointers travel. When the dials of the chart have been so set the chart is turned so that a view may be obtained of its reverse side and it will be found that characters upon the backs of the adjusted dials to which the pointers of the dials are directed may be viewed through the sight perforations in the chart sheet and upon the backs of the dials. These characters, when read in succession, constitute a correct reading of the meter as indicated by the characters to which the pointers are directed upon the obverse side of the chart. The chart may be utilized as an adding device in addition to its utility for meter reading and to this end each dial is provided at its perimeter with notches or marks 3' which correspond to the number of characters surrounding the dial.

To illustrate the use of the chart in performing addition it will be assumed that one of the dials is in the position shown at the right hand side of Fig. I, wherein the pointer is directed toward the numeral 2 and one of the notches or marks 3' is opposite the "0". If it is desired to add the sum of six to the sum indicated by the pointer, the dial is moved until the notch or mark opposite the "0" is brought opposite to the numeral "6" and it will then be found that the pointer will be directed toward the numeral "8" and also that the numeral "8", upon the back of the dial, will appear through the sight perforation in the chart sheet.

In the modification illustrated in Figs. IV and V the chart sheet 1ª is provided with sight perforations 2ª and bears upon its obverse side the numerals 1 to 9 and "0" arranged in circles. 3ª are dials located at the reverse side of the chart sheet and having printed thereon numerals 1 to 9 and "0" which may be viewed through the sight perforations. These dials are rotatably attached to the chart sheet by the arbors 4ª and on said arbors are rigidly mounted pointers 5ª that are adapted to travel in the circle over the face of the chart sheet at its obverse side. It will be seen that when the pointers are moved from numeral to numeral or to the "0" upon the chart sheet the dials are also moved and the numerals and "0" on said dials are brought successively into view through the sight perforations in the sheet to be read in conjunction with each other.

Broadly considered and taken from one point of view, my invention may be looked upon as a device for conveniently indicating on one side with a series of separate indicators with rotating parts the units, tens, hundreds, etc., of a total, and indicating on the other side of the card at the same time the total. For this latter purpose the sight holes are preferably arranged in a straight line, though, of course, that is not essential. Neither is it essential that the indicating devices should be arranged exactly as I have shown them, that is, it is not essential to have the characters in the form of a circle, though, of course, the form I have shown seems to me the best and simplest. It makes no difference what these characters are, though I have shown them as Arabic figures, and in the present form of my device I have shown it as applied to a card suitable for indicating the usual meter readings on one side and on the other the total in an easily read straight line.

I claim:

A meter reading chart comprising a perforate card, a plurality of indicator disks mounted thereon, numbers on the card located about the periphery of said disks, a pointer on each disk in opposition to said numbers, numbers on the reverse of and located about the periphery of each of said disks and registering with the perforations in the card said perforations located in a straight line.

BENJAMIN O. HUTCHISON.

In the presence of—
BLANCHE HOGAN,
LILY POST.

---

Copies of this patent may be obtained for five cents each, by addressing the "Commissioner of Patents, Washington, D. C."